US00RE36636E

United States Patent [19]

Sturm et al.

[11] E Patent Number: Re. 36,636

[45] **Reissued Date of Patent: *Apr. 4, 2000**

[54] DECORATIVE RIBBON

[76] Inventors: Lillian P. Sturm, 121 Hill House, Huntingdon Valley, Pa. 19006; Kurt D. Salomon, 743 Lynwood Dr., Langhorne, Pa. 19047

[ * ] Notice: This patent is subject to a terminal disclaimer.

[21] Appl. No.: 07/999,422

[22] Filed: Dec. 31, 1992

Related U.S. Patent Documents

Reissue of:

[64] Patent No.: 4,981,095
Issued: Jan. 1, 1991
Appl. No.: 07/470,974
Filed: Jan. 26, 1990

U.S. Applications:

[ 63] Continuation of application No. 07/321,720, Mar. 10, 1989, Pat. No. 4,901,661.

[51] Int. Cl.[7] ..... D05C 17/00

[52] U.S. Cl. ..... 112/436; 112/417; 112/426; 112/475.06; 112/475.18

[58] Field of Search ..... 2/244; 112/139, 112/417, 418, 419, 423, 424, 425, 426, 436, 429, 437, 439, 450

[56] References Cited

U.S. PATENT DOCUMENTS

| | | | |
|---|---|---|---|
| 195,698 | 10/1877 | Buchanan | 245/10 |
| 231,176 | 8/1880 | Kohn | 87/7 |
| 255,993 | 4/1882 | Hosmer | 112/436 |
| 296,918 | 4/1884 | Bracher | 112/436 |
| 303,087 | 8/1884 | Wezel | 428/16 |
| 324,082 | 8/1885 | Charmbury | 112/417 |
| 347,466 | 8/1886 | Brautigam | 112/426 |
| 362,576 | 5/1887 | Emerson | 245/6 |
| 371,181 | 10/1887 | Emerson | 245/10 |
| 381,208 | 4/1888 | Bracher | 112/436 |
| 476,454 | 6/1892 | Fefel | 112/417 |
| 640,085 | 12/1899 | Borton | 112/436 |
| 665,982 | 1/1901 | Steffen | 245/8 |
| 726,311 | 4/1903 | Klemm | 112/436 |
| 1,066,759 | 7/1913 | Schloss | 87/2 |
| 1,186,838 | 6/1916 | Rosenfield | 2/195.7 |
| 1,612,820 | 1/1927 | Huber | 112/424 |
| 1,657,184 | 1/1928 | Stevens | 112/475.08 |
| 1,905,685 | 4/1933 | Safir | 2/93 |
| 2,172,224 | 9/1939 | Sailer | 112/410 |
| 2,344,846 | 3/1944 | Berg | 428/17 |
| 2,431,506 | 11/1947 | Reider | 112/426 |

FOREIGN PATENT DOCUMENTS

| | | | |
|---|---|---|---|
| 868334 | 2/1953 | Germany | 112/436 |

*Primary Examiner*—Diana L. Oleksa
*Attorney, Agent, or Firm*—Reed Smith Shaw & McClay LLP

[57] ABSTRACT

This invention relates to decorative ribbons, and to methods and machines for making them. More specifically, the invention relates to fabric ribbons that are edged with wire and trimmed with an overlay of decorative thread.

According to the invention, a run of fabric ribbon is simultaneously edged with wire and tightly bound with a binding filament (such as monofilament) and a trim filament (such as decorative thread). This is done in a single operation. The result is a unique ribbon construction, which has many desirable properties. The new ribbons are flexible, but will retain their shape when bent, twisted or tied into a desired configuration. They are elegantly simple in design and provide a novel streamlined finished product with components that are firmly bound together. The ribbons provide an improved edge and trimming where the wire meets the fabric. They represent an improvement in strength and design, by conveniently providing a two-sided edged ribbon rather than a one-sided edged ribbed with seams and having a definite front side and back side.

4 Claims, 4 Drawing Sheets

DECORATIVE RIBBON

Matter enclosed in heavy brackets [ ] appears in the original patent but forms no part of this reissue specification; matter printed in italics indicates the additions made by reissue.

This is a continuation of application Ser. No. 321,720, filed [Nov.] *Mar.* 10, 1989, now U.S. Pat. No. 4,901,661.

This invention relates to decorative ribbons, and to methods and machines for making them. More specifically, the invention relates to fabric ribbons that are edged with wire and trimmed with an overlay of decorative thread.

According to the invention, a run of fabric ribbon is simultaneously edged with wire and tightly bound with a binding filament (such as monofilament) and a trim filament (such as decorative thread). This is done in a single operation. The result is a unique ribbon construction, which has many desirable properties. The new ribbons are flexible, but will retain their shape when bent, twisted or tied into a desired configuration. They are elegantly simple in design and provide a novel streamlined finished product with components that are firmly bound together. The ribbons provide an improved edge and trimming where the wire meets the fabric. They represent an improvement in strength and design, by conveniently providing a two-sided edged ribbon rather than a one-sided edged ribbon having a definite front side and back side. These and other advantages and objectives will become apparent from the detailed description of the invention below.

BACKGROUND OF THE INVENTION

Decorative fabric ribbons are known, as are fabric ribbons that have been edged with wire. However, the prior art wire ribbons are made by laying a wire near the edge of a fabric ribbon, folding the edge of the ribbon over the wire, and sewing or gluing down the folded edge to hold the wire in place.

This type of construction provides a ribbon that will retain its shape when bent, but which suffers from several significant disadvantages.

The folded edge in these known ribbons produces an unsightly seam, which gives the ribbon a definite front and a back, and which makes it more difficult to fashion the ribbon into pleasing shapes.

When the fabric edge is sewn down, the wire is only loosely held within a fabric sleeve, and thus it can move apart from the ribbon. This makes it more difficult to shape the ribbon, and a sliding wire can result in excess wire at one end of the ribbon and no wire at the other end. The sliding wire also makes the ribbon more difficult to control, and the ribbon is less likely to retain its shape over time. Side to side slippage of the wire can also cause undesirable bunching and/or buckling of the fabric.

Similar problems arise when glue is used. Although some glues may help keep the wire firmly in place, in general the bond is weak and cannot withstand the stress of normal use. Thus, the wire will eventually separate from the glue and ribbon over time, or when the ribbon is bent, twisted or tied in use. In addition, the application of the glue and the removal of excess glue results in significant production and quality control problems. For example, excess glue can deface the fabric ribbon, and glues of sufficient strength to hold the wire in place can degrade the fabric.

Another known method involves loosely sealing a wire between two laminated and/or embossed surfaces, which disadvantageously requires the use of two independent fabric surfaces. These ribbons typically are bulky and have an unsightly rear face. Additionally, the two surfaces have a tendency to separate, which defeats the purpose of having a reliable wired ribbon.

In view of these disadvantages, there has been a need for an improved decorative wired ribbon, especially one that provides a firm and integral union of fabric and wire, without the undesirable folds, seams and glue of prior ribbons.

Accordingly, it is an object of this invention to overcome the disadvantages of known wired ribbons, by providing a fabric ribbon edged with wire and bound with trim, so that the wire is hidden from view and yet is firmly affixed to the ribbon without folds, seams or glue.

It is another object of the invention to provide a method of making ribbons edged with wire and bound with trim.

It is yet another objective to provide an apparatus for making the ribbons of the invention.

SUMMARY OF THE INVENTION

The decorative ribbon of the invention comprises a fabric ribbon, a wire filament, at least one decorative or trim filament, and at least one binding filament. The trim and wire filaments are firmly bound and affixed to the fabric by the binding filament. In a preferred embodiment, this is achieved in one simultaneous and continuous operation. Also, the binding filament is preferably chosen and the trim filament is applied in a size, quantity and manner such that the wire filament and binding filament are both substantially or even completely hidden by the trim filament. This provides a seamless stitched border in one operation that holds the wire filament in place without slippage, and without intermediate folding, gluing, embossing or laminating steps.

The ribbon can be any known fabric ribbon, either flat or pleated. It has been found however that certain lighter weight flat fabrics should be sized, to provide added stiffness, while pleated fabrics generally do not benefit from sizing because the heat treatment used to pleat the fabrics generally increases the stiffness anyway. As the width of the fabric ribbon is increased, the need for sizing also increases, especially in sheer or flimsy fabrics. Any known sizing can be used, such as spray starch, and skilled practitioners can readily determine without undue experimentation whether a particular fabric should be sized in connection with the decorative ribbons of the invention. Other fabric finishes can also be used, as desired.

Preferred finished ribbon sizes according to the invention are widths of 1 7/16 (#9), 2¾ (#40), 4 (#100), 6, and 10 inches.

Pleated fabrics can be obtained from flat fabrics, for use in this invention, according to known means of pleating or texturing fabrics. Typically, a flat fabric is run through a pleating machine that is provided with knives. The fabric is scored with the knives, to produce the textured or pleated effect, which is preserved by heat treating the scored fabric to a temperature of about 250°–300° F. The pleated fabric is sandwiched between holding paper and rolled for storage, so that the pleats retain their shape without damage.

The wire filament can be any flexible filament that will hold its shape without breaking when bent or twisted. The preferred wire filament of the invention is galvanized steel, which can range in gauge from about 22 to 32. The wire filament should be both strong and light, and the most suitable compromise according to the invention, for ribbons ranging in width from 2 to 7 inches, is gauge 26 galvanized steel wire.

The trim filament of the invention can be any known decorative thread of a suitable strength and thickness, which can be wound around the wire filament and through the fabric on a needle, without breaking or snagging, and with enough weight and body to substantially or completely cover the wire filament. Metallic threads are particularly suitable, especially those comprising a metallic strand wrapped with one or two nylon strands. It has been found that a metallic strand that is 1/60th of an inch thick (about 150 gauge) that is wrapped with one, preferably two strands of 70 denier nylon strands is especially preferred. Non-metallic threads can also be used. According to the invention, threads ranging in thickness from 1/100th to 1/50th of an inch, and wrapped with one or two strands (or ends) of nylon ranging from 50 to 90 denier can be used.

The binding filament can be any filament chosen for strength and light weight, and preferably is one strand of monofilament ranging in thickness from 0.005 mil. to 0.009 mil. The preferred monofilament is 0.007 mil. in thickness.

The novel decorative ribbon of the invention is made by binding the wire filament and the trim filament to the fabric ribbon with the binding filament in one operation that both fixes the wire to the edge of the fabric, and hides the wire from view by covering it with turns of trim filament. This is done on a feed-driven stitching machine that is specially modified according to the invention, as further described below. Thus, the stitching machine supplies the fabric ribbon with a co-extensive length of wire filament that is simultaneously bound to the fabric by the binding filament and covered over by the trim filament.

The invention and specific examples and embodiments thereof are further described in connection with the following drawings and detailed description.

DETAILED DESCRIPTION OF THE INVENTION

Figure 2:
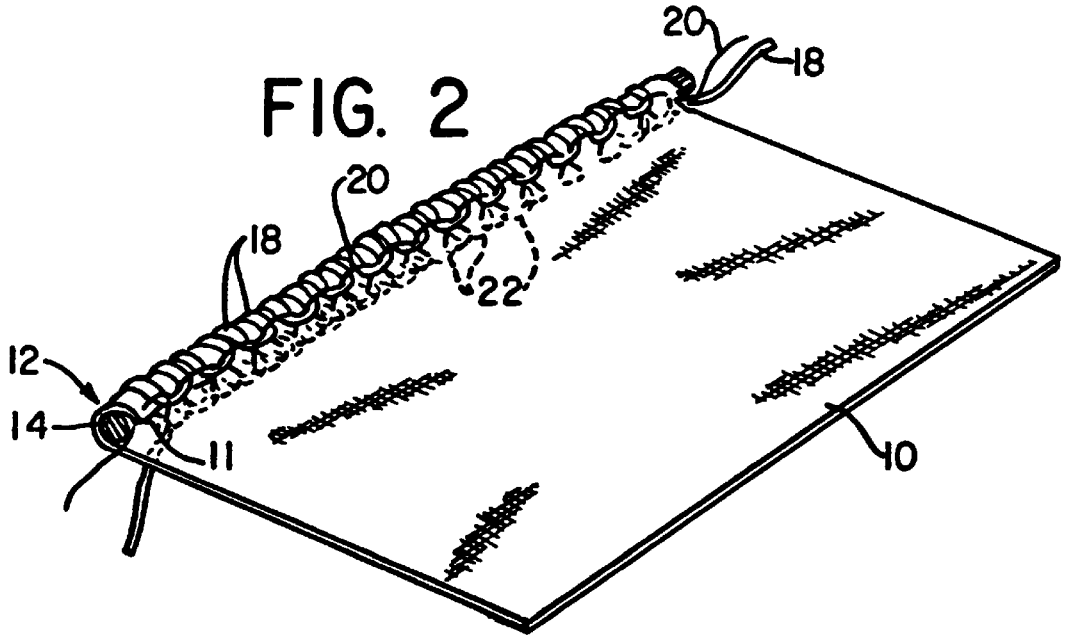
FIG. 2 shows the underside of a decorative ribbon according to the invention with a wire bound to the edge of the fabric and covered over with trim.

Referring to FIG. 2, there is shown a portion of a decorative ribbon including an edge wire secured according to the present invention. The ribbon material 10 includes an actual edge 11 and a side edge 12. In this particular embodiment, a galvanized steel wire filament 14 is positioned along the actual edge 11 of the ribbon material 10 and is surrounded by a smooth fold created by the side edge 12. The ribbon material 10 is secured to the wire filament 14 by a sewing stitch, such as the purl stitch shown. In this embodiment, the stitch includes two filaments, a decorative trim filament 18 and a binding filament 20.

The purpose of the trim filament 18 is to substantially or entirely cover the wire filament 14, the side edge 12 and the actual edge 11, thereby providing a clean, continuous and decorative edge to the ribbon material 10. This can be achieved, as shown, by positioning the trim filament 18 in a curved serpentine fashion around both the wire filament 14 and the side edge 12 of the ribbon material 10. The serpentine shape of the trim filament includes loops 22.

During the stitching process, the binding filament 20 pierces the ribbon material 10 and inter-weaves through the serpentine loops 22 of the trim filament 18. The binding filament 20 is kept taut during the stitching process, and the trim filament 18 and the interposed edge portion of the ribbon are pulled into engagement with the inner wire filament 14. In this way, the decorative trim filament 18 becomes substantially wrapped around the otherwise exposed side edge 12 and the actual edge 11 of the ribbon material 10, all of which are securely bound together by the binding filament 20. Thus, the tight stitch created by the binding and trim filaments, acting together, secures the wire filament 14 to the ribbon material 10. In a preferred embodiment, the binding filament is a natural monofilament, chosen for its strength and also because it is effectively invisible. This allows the trim filament to be seen, so that the ribbon is provided with a securely wired . and decorative edge.

Thus, according to the invention, resulting decorative ribbon product provides a tightly secured hidden wire filament 14 along each edge of the ribbon material to support the ribbon's shape, and a decoratively disguised stitch that permits dual-side ribbon applications.

Figure 7:
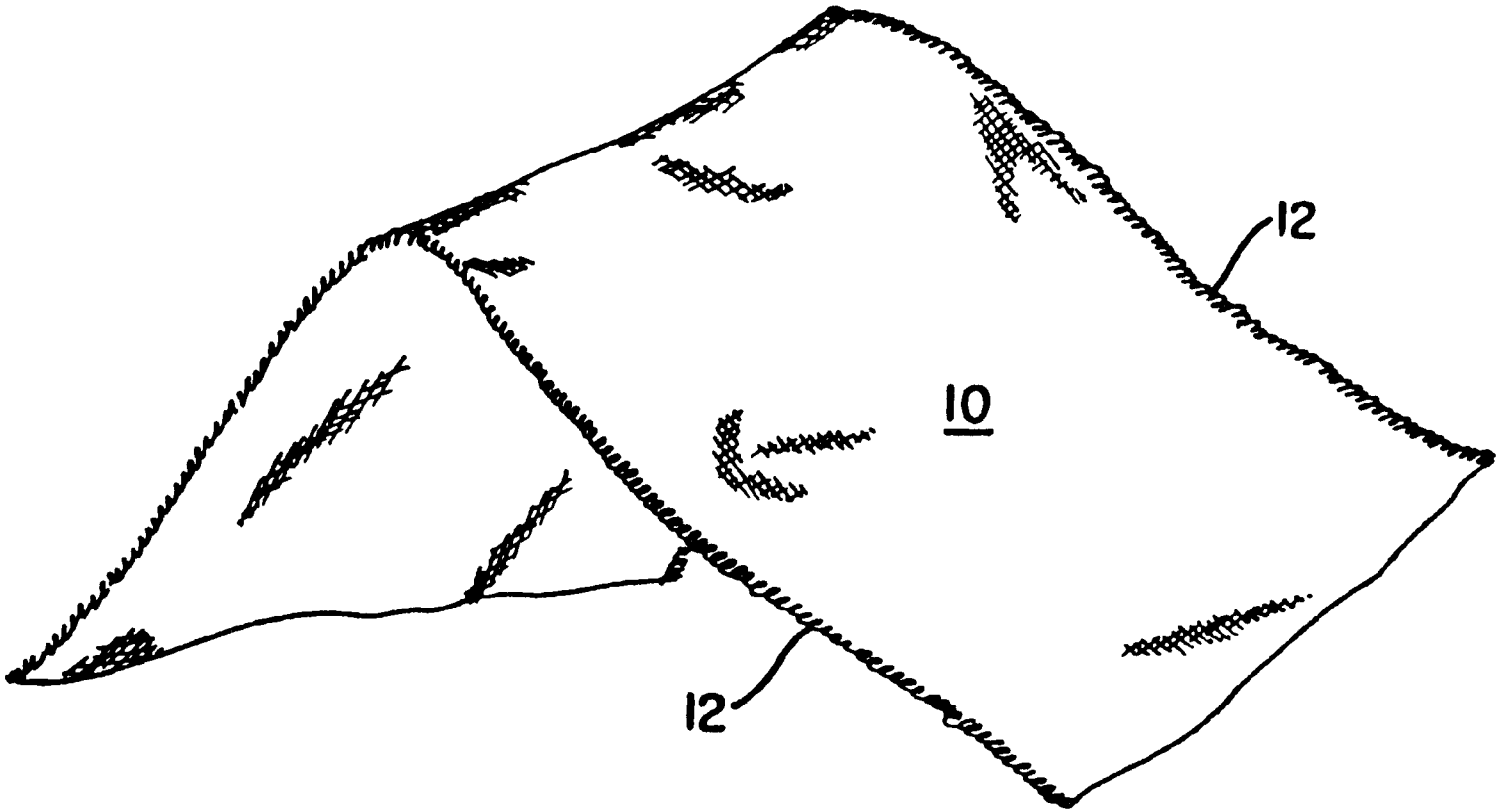
FIG. 7 shows a representative decorative ribbon

FIG. 7 shows a portion of a finished ribbon product having the edge wire arrangement of the present invention. As shown, both sides of the ribbon have an even and clean appearance showing no ribbon edge material.

Figure 1:
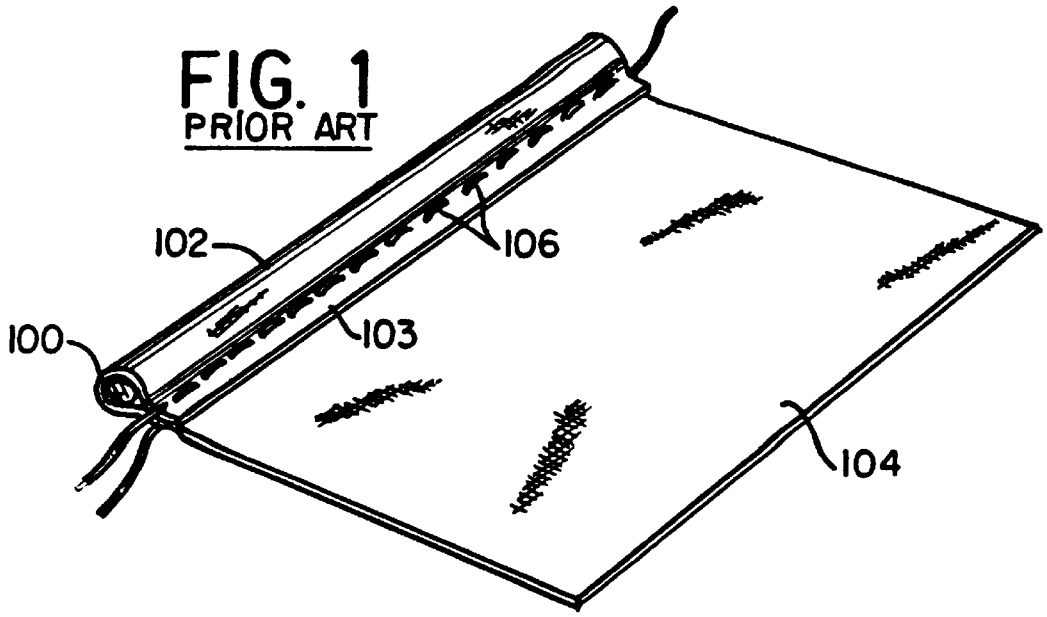
FIG. 1 PRIOR ART
FIG. 1 shows a prior art ribbon with the edge of the ribbon folded over the wire to form a sleeve and seam.

In contrast to the invention, FIG. 1 shows a typical prior art wire-edged ribbon which includes an exposed securing stitch and actual ribbon edge.

In this figure, a wire 100 is surrounded by a fold 102 created along the actual edge 103 of ribbon material 104. The fold 102 is secured flat against the underside (topside as shown in FIG. 1) of the ribbon material 104, near the actual edge 103 using a conventional straight stitch 106. Since no tight frictional force has been applied to the enclosed wire 100, the wire is free to move laterally which could cause the straight stitch 106 to loosen. The wire arrangement shown in FIG. 1 can also move linearly (in a direction parallel to the ribbon edge) which could cause the wire 100 to become completely detached from within the fold 102. In either case, the straight stitch 106 and the actual ribbon edge 103 are in full view along the under side of the ribbon material 104. The resulting finished decorative ribbon product is therefore limited to one-side applications, and has a much less desirable non-uniform appearance. It also suffers from weaknesses in construction that the invention has overcome.

The present invention also provides an improved adaptation to a conventional high speed stitching machine to create the secured wire ribbon-edge arrangement of the present invention. Two examples of such a machine are the Merrow High Speed Trimming & Overseaming Machine (class M) manufactured by the Merrow Company of Hartford, Conn., and the Pegasus S32 manufactured by the Pegasus Sewing Machine Manufacturing Co., Ltd. of Osaka, Japan.

Figure 3:
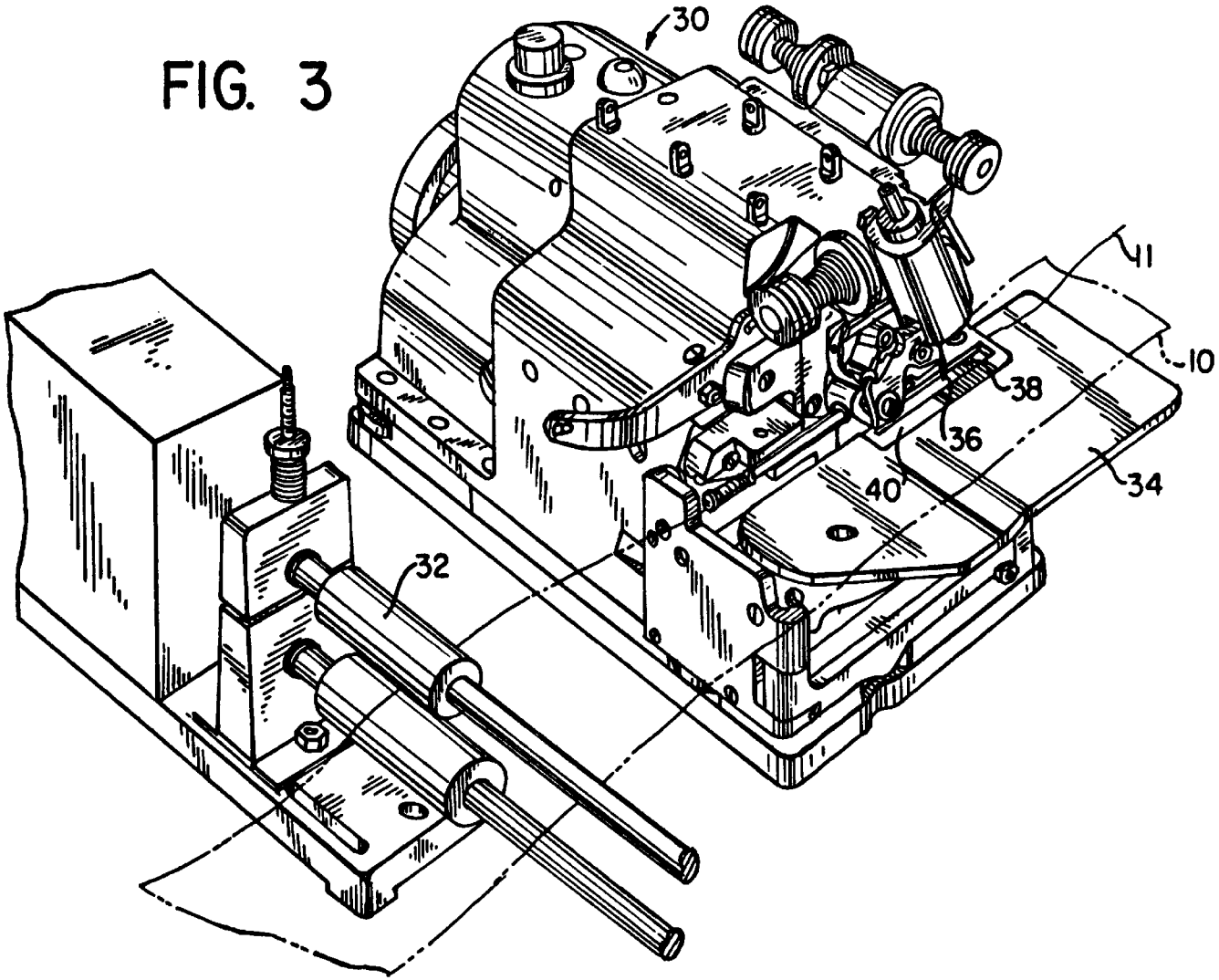
FIG. 3 shows a side view of an apparatus according to the invention.

The stitching machine 30 is shown in FIG. 3, adjacent to guide rollers 32 and includes a work plate 34 for supporting the ribbon material 10, a moveable sewing needle 36, a feed carrier 38 for feeding the ribbon material 10 and a needle plate 40 which is typically recessed into and coplanar with the work plate 34.

The guide rollers 32 are preferably power driven using conventional methods so that the ribbon material 10 is drawn from the work plate 34 of the stitching machine 30 in time with the stitching operation. The purpose of the rollers 32 is to maintain tension in (prevent buckling) the ribbon material 10 during and after it has been stitched. If the ribbon material 10 is not pulled from the stitching machine 30, the stitch can become distorted or otherwise uneven and unattractive and the various elements of the invention (ribbon, wire and filaments) will not be secured in a satisfactory manner.

The drive speed of the rollers 32 is dictated by the feed rate established by the internal feed carrier 38 (not shown in detail), typically protruding from within the needle plate 40. The feed carrier 38 pulls the ribbon material 10 from a supply roll (not shown). It is conventionally known that the drive speed of the guide rollers 32 and the feed rate of the feed carrier 38 should be matched during high speed edge stitching so that the ribbon material 10 can be drawn from the supply roll, stitched, and drawn to a collection roll (also not shown) in a smooth flow.

As understood in the stitching industry, a typical edge stitch comprises two filaments of thread. One thread is usually supplied to the fabric (in this case to the ribbon material 10) by "loopers" from below the needle plate 40 (not shown), while the other thread is fed to the needle 36 usually above the needle plate 40. In the present invention, the first thread (below the needle plate 40) is preferably the trim filament 14 and the second thread (fed to the needle above the needle plate 40) is preferably the binding filament 20. The normal operation of the stitching machine 30 provides a conventional stitch by interweaving the binding filament 20 with the trim filament 18, as further described below.

By the present invention, a wire filament 14 is provided within the fold of the side edge 12 of the ribbon material 10, before the stitch is produced by the stitching machine 30. It is desireable to form the side edge 12 of the ribbon material around the wire filament 14 immediately prior to the stitch so that a consistent and even ribbon edge can be secured by the stitching filaments without the need for expensive and complex assemblies to maintain the shape of the side loop 12 during its feed to the needle plate 40.

Figure 4:
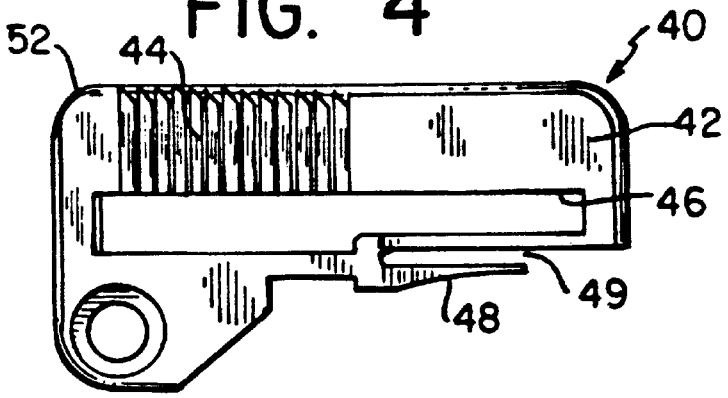
FIG. 4 shows an enlarged top view of a portion of FIG. 3, showing a needle plate according to the invention.
Figure 5:
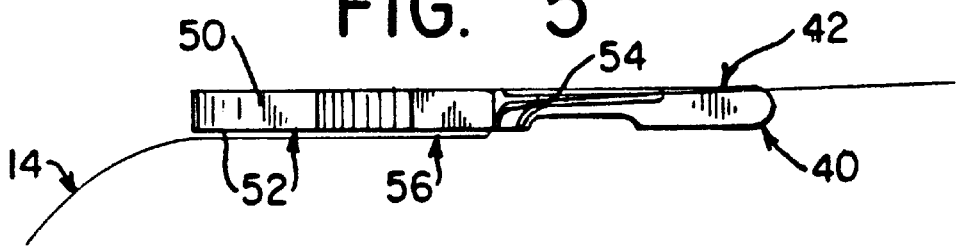
FIG. 5 shows an enlarged bottom view of a portion of FIG. 3, showing a needle plate according to the invention.
Figure 6:
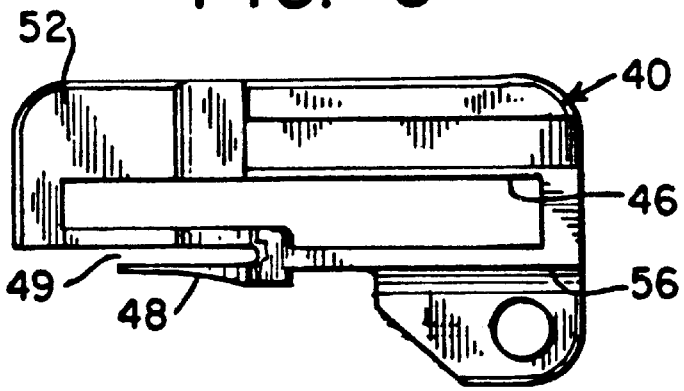
FIG. 6 shows an enlarged side view of a portion of FIG. 3, showing a needle plate according to the invention.

The present invention provides a needle plate 40 which has been improved such that a wire filament 14 can be guided to and incorporated with the side edge 12 of the ribbon material 10 during the stitching process. The needle plate 40 of the present invention is shown in FIGS. 4–6. The needle plate 40 includes a top portion 42 having conventional fabric engagement teeth 44, a feed carrier access slot 46, a fabric support tine 48 for supporting the fabric (ribbon material) adjacent to the moving needle, and a needle stitching slot 49. The needle plate 40 also includes a side portion 50 and a bottom portion 52. The side portion 50 includes a side groove 54 along the side of the support tine 48. The side groove 54 is of proper dimensions to effectively guide a sliding wire filament of a chosen size from a wire filament source (not shown) to the ribbon material 10, specifically along the ribbon's edge. A similarly shaped bottom groove 56 is disposed substantially inline with that of the side groove 54. As shown in FIG. 5, the wire filament 14 is guided by both side and bottom grooves (54, 56) without stress or deformation. The wire filament 14 is first guided from its source, and under the work plate 34 (FIG. 3), by the bottom groove 56 along the bottom portion of the needle plate 40 and then, by the side groove 54 along the side of the support tine 48 following a gradually inclined direction. The wire filament 14 eventually becomes located adjacent to the top portion of the needle plate 40 where it can easily be positioned within a fold of the ribbon's side edge 12 and secured to the ribbon material 10 during the stitching process.

Referring to FIGS. 2 and 3, one edge 11 of the ribbon material 10 is folded towards the center of the ribbon (downwardly in a preferred embodiment), forming a side edge 12 through which the wire filament 14 may positioned and secured. It is known in the stitching industry to loop the edges of a fabric. Any of the known techniques can be incorporated with the stitching machine 30 so that a side edge 12 of the ribbon material 10 is formed around the wire filament 14 just prior to the stitching process. It is preferred, however that the fold in the side edge 12 be limited according to the size of the wire used. It is preferable that with any wire used, the side edge 12 be such that when it is in tight engagement around the wire filament 14, the actual edge 11 of the of the ribbon material 10 will at most, just contact the surface of the adjacent ribbon material 10. If a larger fold is formed, the ribbon material 10 may buckle and fold when it overlaps the ribbon material 10 and an undesirable seam will result. Such buckling may also cause the secured ribbon edge to be uneven and could create spots along the wire filament 14 where the ribbon material is not in tight engagement with the wire.

In operation, a supply of an appropriate decorative trim filament 18 and a supply of binding filament 20 are loaded in a conventional manner into a standard stitching machine, like the preferred Merrow or Pegasus machine. A wire filament 14 is fed through the needle plate 40, guided by both the side groove 54 and the bottom groove 56 and is ultimately drawn with the ribbon by the rollers 32. The ribbon material 10 is positioned in a conventional manner onto the work plate 34 of the stitching machine 30. As the machine operates, the edge of the ribbon material 10 is formed into a fold around the adjacent wire filament 14. The previously described stitch is then produced around the edge loop 12 and the enclosed wire 14. The stitching process creates the necessary pull required to ensure tight engagement between the wire filament 14 and the ribbon material 10.

The tightness of the stitch can be regulated by adjusting the cams of the stitching machine. In a preferred embodiment, the cams are adjusted so that the trim filament is wrapped tightly, with each turn of the filament just touching or overlapping each adjacent turn, so that the wire and the edge of the ribbon are covered over. It will also be appreciated by skilled practitioners that more than one trim filament or binding filament can be used on each edge of the ribbon. Preferably, one or two trim filaments is used and one binding filament is used.

Although preferred embodiments of the invention are described in detail herein, it will be appreciated by skilled practitioners that the invention can also be practiced in other embodiments, and the present examples do not serve to narrow the appended claims.

We claim:

1. A decorative ribbon comprising:

a web of ribbon material having two faces and a folded edge therebetween;

a wire filament disposed along and within said edge; and stitch means for securing the edge of the web to said wire filament, said stitch means including a trim filament, said trim filament substantially covering the edge and the wire filament from view from at least one said face, and a binding filament passing through said web proximate to said edge and interlocking with the trim filament to secure the wire filament and the trim filament to the edge, said binding filament and trim filament being of different constructions.

2. A method of securing a wire filament along an edge of a fabric ribbon, comprising the steps of:

positioning a wire filament adjacent to and in parallel contact with said edge;

folding the edge of the ribbon around the wire filament such that at least some of the circumference of the wire filament is coextensive with and covered by the ribbon, thereby creating a sleeve of fabric for engaging the wire filament; and stitching said wire filament to said edge using at least two additional filaments, such that the wire filament is in tight engagement with the edge, said stitching step including, in a single continuous operation, passing a trim filament at least partially around the edge and the wire filament, said trim filament covering substantially all of the wire filament from view from at least one face of the ribbon, and passing a binding filament through the ribbon proximate the edge, and intermingling said binding filament with the trim filament and the wire filament to secure the wire filament to the edge.

*3. A method of securing a wire filament along an edge of a web of fabric ribbon having top and bottom faces and at least a first edge therealong, said method comprising the steps of:*

*positioning a wire filament along said web of fabric in parallel relationship with and adjacent to said first edge of said web; and*

*stitching said wire filament to said fabric web using at least two additional filaments, such that said wire filament is in tight engagement with of said web, said stitching step including, in a single continuous operation:*

*passing a binding filament through said web and around said wire filament to secure said wire filament against said web, and*

*interlocking a trim filament with said binding filament along said web such that said trim filament substantially covers said wire filament and said edge from view along at least one of said faces.*

*4. A method as claimed in claim 3, wherein said wire filament is positioned along said bottom face of said web.*

* * * * *